(12) United States Patent
Yang et al.

(10) Patent No.: US 11,973,710 B2
(45) Date of Patent: Apr. 30, 2024

(54) RESOURCE CONFIGURATION METHOD AND DEVICE

(71) Applicant: VIVO MOBILE COMMUNICATION CO., LTD., Guangdong (CN)

(72) Inventors: Ang Yang, Guangdong (CN); Peng Sun, Guangdong (CN); Yu Yang, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 369 days.

(21) Appl. No.: 17/407,360

(22) Filed: Aug. 20, 2021

(65) Prior Publication Data

US 2021/0385041 A1 Dec. 9, 2021

Related U.S. Application Data

(63) Continuation of application No. PCT/CN2020/075572, filed on Feb. 17, 2020.

(30) Foreign Application Priority Data

Feb. 20, 2019 (CN) .......................... 201910127574.8

(51) Int. Cl.
*H04W 4/00* (2018.01)
*H04L 5/00* (2006.01)
*H04W 72/044* (2023.01)
*H04W 72/21* (2023.01)

(52) U.S. Cl.
CPC ......... *H04L 5/0048* (2013.01); *H04W 72/046* (2013.01); *H04W 72/21* (2023.01)

(58) Field of Classification Search
CPC ... H04L 5/0048; H04L 5/0023; H04L 5/0091; H04L 5/0051; H04L 5/0057; H04W 72/046; H04W 72/21; H04W 72/20; H04B 7/0404; H04B 7/0691; H04B 7/0695
See application file for complete search history.

(56) References Cited

U.S. PATENT DOCUMENTS

| | | | |
|---|---|---|---|
| 10,516,514 B2* | 12/2019 | Park | H04B 7/0404 |
| 2017/0317866 A1* | 11/2017 | Stirling-Gallacher | H04B 7/0695 |
| 2018/0206132 A1* | 7/2018 | Guo | H04B 7/0404 |
| 2018/0227094 A1* | 8/2018 | Liu | H04B 7/06966 |

(Continued)

FOREIGN PATENT DOCUMENTS

| | | |
|---|---|---|
| CA | 3071085 A1 | 1/2019 |
| CN | 108092697 A | 5/2018 |

(Continued)

OTHER PUBLICATIONS

LG Electronics, "Feature lead summary of Enhancements on Multi-beam Operations", 3GPP TSG RAN WG1 Ad-Hoc Meeting 1901, R1-1901348, Taipei, Taiwan, Jan. 21-25, 2019.

(Continued)

*Primary Examiner* — Stephen M D Agosta
(74) *Attorney, Agent, or Firm* — Price Heneveld LLP

(57) ABSTRACT

Embodiments of the present disclosure provide a resource configuration method and a device. The method includes: sending configuration information to a terminal device, where the configuration information is used to configure a target SRS resource in M SRS resource sets, and M is a positive integer greater than or equal to 2.

20 Claims, 3 Drawing Sheets

(56) References Cited

U.S. PATENT DOCUMENTS

| | | |
|---|---|---|
| 2018/0367205 A1 | 12/2018 | Liu et al. |
| 2019/0174466 A1* | 6/2019 | Zhang ................... H04L 5/0057 |
| 2019/0174527 A1* | 6/2019 | Park ................... H04L 25/0224 |
| 2019/0207731 A1 | 7/2019 | Park et al. |
| 2019/0239245 A1* | 8/2019 | Davydov ............. H04L 5/0048 |
| 2019/0372734 A1* | 12/2019 | Choi ................... H04B 7/0628 |
| 2020/0067739 A1* | 2/2020 | Tang ................... H04B 7/0617 |
| 2020/0092055 A1* | 3/2020 | Choi ....................... H04L 5/005 |
| 2020/0162289 A1 | 5/2020 | Ahn et al. |
| 2020/0163079 A1* | 5/2020 | Choi ................... H04B 7/0695 |
| 2020/0177416 A1* | 6/2020 | Jiang ................... H04L 5/0048 |
| 2020/0213054 A1* | 7/2020 | Park ................... H04B 7/0639 |
| 2020/0280416 A1 | 9/2020 | Gao et al. |
| 2020/0366429 A1* | 11/2020 | Huang ................ H04W 72/542 |
| 2021/0058274 A1* | 2/2021 | Osawa ................ H04B 7/0456 |
| 2021/0067289 A1* | 3/2021 | Zhu ........................ H04B 7/088 |
| 2021/0234588 A1 | 7/2021 | Li et al. |
| 2021/0297217 A1 | 9/2021 | Xu et al. |

FOREIGN PATENT DOCUMENTS

| | | |
|---|---|---|
| CN | 108092754 A | 5/2018 |
| CN | 109302273 A | 2/2019 |
| CN | 110474727 A | 11/2019 |
| EP | 3780469 A1 | 2/2021 |
| WO | 2018128504 A1 | 7/2018 |
| WO | 2018151554 A1 | 8/2018 |
| WO | 2018203680 A1 | 11/2018 |
| WO | 2019029428 A1 | 2/2019 |
| WO | 2019029517 A1 | 2/2019 |
| WO | 2019029684 A1 | 2/2019 |

OTHER PUBLICATIONS

VIVO, "Draft CR 2 on SRS power control for 38.213", 3GPP TSG-RAN WG1 Meeting #95, R1-1812292, Spokane, USA, Nov. 12-16, 2018.

VIVO, "Draft CR 3 on SRS power control for 38.214", 3GPP TSG-RAN WG1 Meeting #95, R1-1812292, Spokane, USA, Nov. 12-16, 2018.

VIVO, Draft CR for UL power control; 3GPP TSG RAN WG1 Meeting #95, Spokane, USA, Nov. 12-16, 2018; 6 pages.

Change Request, 3GPP TSG-RAN WG1 Meeting #95, $1-1812292, Spokane, USA, Nov. 12-16, 2018, 2 pages.

\* cited by examiner

Send configuration information to a terminal device, where the configuration information is used to configure a target SRS resource in M SRS resource sets, and M is a positive integer greater than or equal to 2 — S110

FIG. 1

Send configuration information to a terminal device, where the configuration information is used to configure a target SRS resource in M SRS resource sets, and M is a positive integer greater than or equal to 2 — S110

Determine a quantity of antenna panels that are used by the terminal device to send an SRS corresponding to the target SRS resource — S120

If the quantity of antenna panels that are used by the terminal device to send the SRS corresponding to the target SRS resource is 1, receive an SRS that is sent by the terminal device by using an antenna panel associated with a target SRS resource set in the M SRS resource sets, where the target SRS resource set is randomly determined by the terminal device from the M SRS resource sets or the target SRS resource set meets a preset rule — S130

FIG. 2

Receive configuration information, where the configuration information is used to configure a target SRS resource in M SRS resource sets, and M is a positive integer greater than or equal to 2 — S210

FIG. 3

RESOURCE CONFIGURATION METHOD AND DEVICE

CROSS-REFERENCE TO RELATED APPLICATIONS

This application is a continuation application of International Application No. PCT/CN2020/075572 filed on Feb. 17, 2020, which claims priority to Chinese Patent Application No. 201910127574.8, filed on Feb. 20, 2019 in China, both disclosures of which are incorporated herein by reference in their entireties.

TECHNICAL FIELD

The present disclosure relates to the field of communications technologies, and more specifically, to a resource configuration method and a device.

BACKGROUND

In a current mobile communications system, for an uplink beam training process, a network device configures one or more sounding reference signal (SRS) resource sets for a terminal device by using radio resource control (RRC) signaling. For each SRS resource set, the network device configures at least one SRS resource by using RRC signaling, and a maximum quantity of configured SRS resources is determined based on a capability of the terminal device.

A usage of the SRS resource set is determined by using RRC signaling. When the network device sets the usage to beam management, for each SRS resource set, an SRS can be sent on only one SRS resource at an uplink sending moment. SRSs sent on SRS resources in different SRS resources may be simultaneously sent by the terminal device.

It may be learned from the foregoing description that, currently, when configuring a plurality of SRS resource sets for the terminal device, the network device cannot determine whether a same SRS resource can be configured in the plurality of SRS resource sets, thereby affecting validity of mobile communication.

SUMMARY

According to a first aspect, a resource configuration method is provided, and the method includes:
sending configuration information to a terminal device, where the configuration information is used to configure a target SRS resource in M SRS resource sets, and M is a positive integer greater than or equal to 2.

According to a second aspect, a resource configuration method is provided, and the method includes:
receiving configuration information, where the configuration information is used to configure a target SRS resource in M SRS resource sets, and M is a positive integer greater than or equal to 2.

According to a third aspect, a network device is provided, and the network device includes:
a transceiver module, configured to send configuration information to a terminal device, where the configuration information is used to configure a target SRS resource in M SRS resource sets, and M is a positive integer greater than or equal to 2.

According to a fourth aspect, a terminal device is provided, and the terminal device includes:
a transceiver module, configured to receive configuration information, where the configuration information is used to configure a target SRS resource in M SRS resource sets, and M is a positive integer greater than or equal to 2.

According to a fifth aspect, a network device is provided, including a memory, a processor, and a computer program that is stored in the memory and that can be run by the processor, where when the computer program is executed by the processor, the steps of the resource configuration method in the first aspect are implemented.

According to a sixth aspect, a terminal device is provided, including a memory, a processor, and a computer program that is stored in the memory and that can be run by the processor, where when the computer program is executed by the processor, the steps of the resource configuration method in the second aspect are implemented.

According to a seventh aspect, a computer-readable medium is provided. The computer-readable medium stores a computer program, and when the computer program is executed by a processor, the steps of the resource configuration method in the first aspect are implemented.

According to an eighth aspect, a computer-readable storage medium is provided. The computer-readable storage medium stores a computer program, and when the computer program is executed by a processor, the steps of the resource configuration method in the second aspect are implemented.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings:

FIG. 1 is a schematic flowchart of a resource configuration method according to an embodiment of the present disclosure;

FIG. 2 is another schematic flowchart of a resource configuration method according to an embodiment of the present disclosure;

FIG. 3 is a schematic flowchart of a resource configuration method according to another embodiment of the present disclosure;

DESCRIPTION OF EMBODIMENTS

Figure 4:
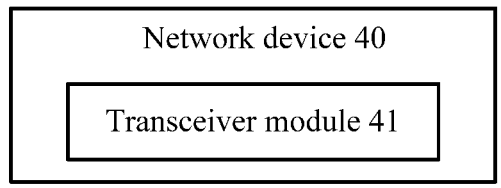
FIG. 4 is a schematic structural diagram of a network device according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The technical solutions of the present disclosure may be applied to various communications systems, such as a Long Term Evolution (LTE)/Long Term Evolution-advanced (LTE-A) system and a new radio (NR) system.

A terminal device (UE), also referred to as a mobile terminal, a mobile user device, and the like in the embodiments of the present disclosure, may communicate with one or more core networks through a radio access network (for example, Radio Access Network, RAN). User equipment may be a mobile terminal, such as a mobile phone (or referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

A network device in the embodiments of the present disclosure is an apparatus deployed in a radio access network to provide a wireless communication function for a terminal device. For example, the network device may be a base station, and the base station may be an evolved NodeB (eNB or e-NodeB, evolutional NodeB) and a 5G base station (gNB) in LTE.

It should be noted that an antenna panel in the embodiments of the present disclosure may also be referred to as an "antenna set", an "antenna port", or the like.

The following describes in detail the technical solutions provided in the embodiments of the present disclosure with reference to the accompanying drawings.

FIG. 1 shows a resource configuration method according to an embodiment of the present disclosure. As shown in FIG. 1, the method includes:

S110. Send configuration information to a terminal device, where the configuration information is used to configure a target SRS resource in M SRS resource sets, and M is a positive integer greater than or equal to 2.

Optionally, the sending configuration information to a terminal device in S110 includes: determining, based on target information, whether the target SRS resource is allowed to be configured in a plurality of SRS resource sets; and sending the configuration information to the terminal device if the target SRS resource is allowed to be configured in the plurality of SRS resource sets.

In other words, before a network device sends configuration information of configuring a same SRS resource in the plurality of SRS resource sets to the terminal device, the network device determines, based on the target information, whether the SRS resource is allowed to be configured in the plurality of SRS resource sets. If the SRS resource is allowed to be configured in the plurality of SRS resource sets, the network device sends the configuration information to the terminal device to configure the SRS resource in the plurality of SRS resource sets.

In an example, the target information includes at least one of information about an SRS corresponding to the target SRS resource or a downlink beam report. Herein, the SRS corresponding to the target SRS resource may be understood as an SRS that needs to be transmitted on the target SRS resource.

Specifically, in some embodiments, the information about the SRS includes at least one piece of the following information: a usage of the SRS; a time domain characteristic of the SRS; a relationship between the SRS and a reference RS that is used to determine spatial relationship information of a target channel or a target signal; and a type of a reference RS that is used to determine spatial relationship information of the SRS.

With reference to a specific example, the following describes in detail how the network device determines, based on the target information, whether the target SRS resource is allowed to be configured in the plurality of SRS resource sets.

Example a

The information about the SRS includes the usage of the SRS. In this case, if the usage of the SRS is beam management, it is determined that the target SRS resource is not allowed to be configured in the plurality of SRS resource sets; or if the usage of the SRS is one of codebook-based transmission (Codebook), non-codebook-based transmission (non-Codebook), or antenna switching, it is determined that the target SRS resource is allowed to be configured in the plurality of SRS resource sets.

Example b

The information about the SRS includes the usage of the SRS. In this case, if the usage of the SRS is beam management, it is determined that the target SRS resource is not allowed to be configured in the plurality of SRS resource sets; or if the usage of the SRS is one of codebook-based transmission, non-codebook-based transmission, or antenna switching, it is determined, based on at least one of the time domain characteristic of the SRS, the relationship between the SRS and the reference RS that is used to determine the spatial relationship information of the target channel or the target signal, the type of the reference RS that is used to determine the spatial relationship information of the SRS, or the downlink beam report, whether the target SRS resource is allowed to be configured in the plurality of SRS resource sets.

For example, if the usage of the SRS is one of codebook-based transmission, non-codebook-based transmission, or antenna switching, it is determined, based on the time domain characteristic of the SRS, whether the target SRS resource is allowed to be configured in the plurality of SRS resource sets. In this case, if the SRS is a periodic SRS or a semi-periodic SRS, it is determined that the target SRS resource is not allowed to be configured in the plurality of SRS resource sets; or if the SRS is an aperiodic SRS, it is determined that the target SRS is allowed to be configured in the plurality of SRS resource sets.

Alternatively, for another example, if the usage of the SRS is one of codebook-based transmission, non-codebook-based transmission, or antenna switching, it is determined, based on the relationship between the SRS and the reference RS that is used to determine the spatial relationship information of the target channel or the target signal, whether the target SRS is allowed to be configured in the plurality of SRS resource sets. In this case, if the reference RS that is used to determine the spatial relationship information of the target channel or the target signal includes the SRS, it is determined that the target SRS resource is not allowed to be configured in the plurality of SRS resource sets; or if the reference RS that is used to determine the spatial relationship information of the target channel or the target signal does not include the SRS, it is determined that the target SRS resource is allowed to be configured in the plurality of SRS resource sets.

Alternatively, for another example, if the usage of the SRS is one of codebook-based transmission, non-codebook-based transmission, or antenna switching, it is determined, based on the type of the reference RS that is used to determine the spatial relationship information of the SRS, whether the target SRS is allowed to be configured in the plurality of SRS resource sets. In this case, if the reference RS that is used to determine the spatial relationship information of the SRS is an SRS, it is determined that the target SRS resource is not allowed to be configured in the plurality of SRS resource sets; or if the reference RS that is used to determine the spatial relationship information of the SRS is a synchronization signal block (SSB) or a channel state information-reference signal (CSI-RS), it is determined that the target SRS resource is allowed to be configured in the plurality of SRS resource sets.

Alternatively, for another example, if the usage of the SRS is one of codebook-based transmission, non-codebook-based transmission, or antenna switching, it is determined, based on the downlink beam report, whether the target SRS resource is allowed to be configured in the plurality of SRS resource sets. In this case, if the downlink beam report is not associated with an antenna panel of the terminal device or the downlink beam report is not received before the configuration information is sent, it is determined that the target SRS resource is not allowed to be configured in the plurality of SRS resource sets; or if the downlink beam report is associated with the antenna panel of the terminal device, it is determined, based on a quantity of antenna panels associated with the downlink report, whether the target SRS resource is allowed to be configured in the plurality of SRS resource sets. For example, if the quantity of antenna panels associated with the downlink beam report is 1, it is determined that the target SRS resource is allowed to be configured in the plurality of SRS resource sets; or if the quantity of antenna panels associated with the downlink beam report is greater than 1, it is determined that the target SRS resource is not allowed to be configured in the plurality of SRS resource sets.

Alternatively, for another example, if the usage of the SRS is one of codebook-based transmission, non-codebook-based transmission, or antenna switching, it is determined, based on the time domain characteristic of the SRS and the relationship between the SRS and the reference RS that is used to determine the spatial relationship information of the target channel or the target signal, whether the target SRS is allowed to be configured in the plurality of SRS resource sets. In this case, if the SRS is an aperiodic SRS and the reference RS that is used to determine the spatial relationship information of the target channel or the target signal does not include the SRS, it is determined that the target SRS resource is allowed to be configured in the plurality of SRS resource sets; otherwise, it is determined that the target SRS resource is not allowed to be configured in the plurality of SRS resource sets.

Alternatively, if the usage of the SRS is one of codebook-based transmission, non-codebook-based transmission, or antenna switching, it is determined, based on the time domain characteristic of the SRS and the type of the reference RS that is used to determine the spatial relationship information of the SRS, whether the target SRS resource is allowed to be configured in the plurality of SRS resource sets. In this case, if the SRS is an aperiodic SRS and the reference RS that is used to determine the spatial relationship information of the SRS is a synchronization signal block SSB or a channel state information-reference signal CSI-RS, it is determined that the target SRS resource is allowed to be configured in the plurality of SRS resource sets; otherwise, it is determined that the target SRS resource is not allowed to be configured in the plurality of SRS resource sets.

Alternatively, if the usage of the SRS is one of codebook-based transmission, non-codebook-based transmission, or antenna switching, it is determined, based on the time domain characteristic of the SRS and the downlink beam report, whether the target SRS resource is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the usage of the SRS is one of codebook-based transmission, non-codebook-based transmission, or antenna switching, it is determined, based on the relationship between the SRS and the reference RS that is used to determine the spatial relationship information of the target channel or the target signal and the type of the reference RS that is used to determine the spatial relationship information of the SRS, whether the target SRS is allowed to be configured in the plurality of SRS resource sets. In this case, if the reference RS that is used to determine the spatial relationship information of the target channel or the target signal does not include the SRS and the reference RS that is used to determine the spatial relationship information of the SRS is a synchronization signal block SSB or a channel state information-reference signal CSI-RS, it is determined that the target SRS resource is allowed to be configured in the plurality of SRS resource sets; otherwise, it is determined that the target SRS resource is not allowed to be configured in the plurality of SRS resource sets.

Alternatively, if the usage of the SRS is one of codebook-based transmission, non-codebook-based transmission, or antenna switching, it is determined, based on the relationship between the SRS and the reference RS that is used to determine the spatial relationship information of the target channel or the target signal and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the usage of the SRS is one of codebook-based transmission, non-codebook-based transmission, or antenna switching, it is determined, based on the type of the reference RS that is used to determine the spatial relationship information of the SRS and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the usage of the SRS is one of codebook-based transmission, non-codebook-based transmission, or antenna switching, it is determined, based on the time domain characteristic of the SRS, the relationship between the SRS and the reference RS that is used to determine the spatial relationship information of the target channel or the target signal, and the type of the reference RS that is used to determine the spatial relationship information of the SRS, whether the target SRS is allowed to be configured in the plurality of SRS resource sets. In this case, if the SRS is an aperiodic SRS, the reference RS that is used to determine the spatial relationship information of the target channel or the target signal does not include the SRS, and the reference RS that is used to determine the spatial relationship information of the SRS is a synchronization signal block SSB or a channel state information-reference signal CSI-RS, it is determined that the target SRS resource is allowed to be configured in the plurality of SRS resource sets; otherwise, it is determined that the target SRS resource is not allowed to be configured in the plurality of SRS resource sets.

Alternatively, if the usage of the SRS is one of codebook-based transmission, non-codebook-based transmission, or antenna switching, it is determined, based on the time domain characteristic of the SRS, the relationship between the SRS and the reference RS that is used to determine the spatial relationship information of the target channel or the target signal, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the usage of the SRS is one of codebook-based transmission, non-codebook-based transmission, or antenna switching, it is determined, based on the time domain characteristic of the SRS, the type of the reference RS that is used to determine the spatial relationship information of the SRS, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the usage of the SRS is one of codebook-based transmission, non-codebook-based transmission, or antenna switching, it is determined, based on the relationship between the SRS and the reference RS that is used to determine the spatial relationship information of the target channel or the target signal, the type of the reference RS that is used to determine the spatial relationship information of the SRS, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the usage of the SRS is one of codebook-based transmission, non-codebook-based transmission, or antenna switching, it is determined, based on the time domain characteristic of the SRS, the relationship between the SRS and the reference RS that is used to determine the spatial relationship information of the target channel or the target signal, the type of the reference RS that is used to determine the spatial relationship information of the SRS, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

It should be noted that the foregoing example of determining, based on at least one of the time domain characteristic of the SRS, the relationship between the SRS and the reference RS that is used to determine the spatial relationship information of the target channel or the target signal, the type of the reference RS that is used to determine the spatial relationship information of the SRS, or the downlink beam report, whether the target SRS resource is allowed to be configured in the plurality of SRS resource sets is merely intended to enable a person skilled in the art to understand the technical solutions of the embodiments of the present disclosure, and not to limit a protection range.

Example c

The information about the SRS includes the time domain characteristic of the SRS. In this case, if the SRS is a periodic SRS or a semi-periodic SRS, it is determined that the target SRS resource is not allowed to be configured in the plurality of SRS resource sets; or if the SRS is an aperiodic SRS, it is determined that the target SRS resource is allowed to be configured in the plurality of SRS resource sets.

For example, the SRS is an aperiodic SRS, and the network device configures the target SRS resource in the plurality of SRS resource sets by using the configuration information. Then, if the network device triggers one SRS resource set by using downlink control information (DCI), the terminal device considers that an SRS corresponding to a target SRS in the triggered SRS resource set is sent by using a panel corresponding to a set identifier of the SRS resource set.

Example d

The information about the SRS includes the time domain characteristic of the SRS. In this case, if the SRS is a periodic SRS or a semi-periodic SRS, it is determined that the target SRS resource is not allowed to be configured in the plurality of SRS resource sets; or if the SRS is an aperiodic SRS, it is determined, based on at least one of the usage of the SRS, the relationship between the SRS or the reference RS that is used to determine the spatial relationship information of the target channel or the target signal, the type of the reference RS that is used to determine the spatial relationship information of the SRS, and the downlink beam report, whether the target SRS resource is allowed to be configured in the plurality of SRS resource sets.

For example, if the SRS is an aperiodic SRS, it is determined, based on the usage of the SRS, that the target SRS resource is allowed to be configured in the plurality of SRS resource sets. In this case, if the usage of the SRS is one of codebook-based transmission, non-codebook-based transmission, or antenna switching, it is determined that the target SRS resource is allowed to be configured in the plurality of SRS resource sets; or if the usage of the SRS is beam management, it is determined that the target SRS is not allowed to be configured in the plurality of SRS resource sets.

Alternatively, for another example, if the SRS is an aperiodic SRS, it is determined, based on the relationship between the SRS and the reference RS that is used to determine the spatial relationship information of the target channel or the target signal, whether the target SRS is allowed to be configured in the plurality of SRS resource sets. In this case, if the reference RS that is used to determine the spatial relationship information of the target channel or the target signal includes the SRS, it is determined that the target SRS resource is not allowed to be configured in the plurality of SRS resource sets; or if the reference RS that is used to determine the spatial relationship information of the target channel or the target signal does not include the SRS, it is determined that the target SRS resource is allowed to be configured in the plurality of SRS resource sets.

Alternatively, for another example, if the SRS is an aperiodic SRS, it is determined, based on the type of the reference RS that is used to determine the spatial relationship information of the SRS, whether the target SRS is allowed to be configured in the plurality of SRS resource sets. In this case, if the reference RS that is used to determine the spatial relationship information of the SRS is an SRS, it is determined that the target SRS resource is not allowed to be configured in the plurality of SRS resource sets; or if the reference RS that is used to determine the spatial relationship information of the SRS is a synchronization signal block SSB or a channel state information-reference signal CSI-RS, it is determined that the target SRS resource is allowed to be configured in the plurality of SRS resource sets.

Alternatively, for another example, if the SRS is an aperiodic SRS, it is determined, based on the downlink beam report, whether the target SRS resource is allowed to be configured in the plurality of SRS resource sets. In this case, if the downlink beam report is not associated with an antenna panel of the terminal device or the downlink beam report is not received before the configuration information is sent, it is determined that the target SRS resource is not allowed to be configured in the plurality of SRS resource sets; or if the downlink beam report is associated with the antenna panel of the terminal device, it is determined, based on a quantity of antenna panels associated with the downlink report, whether the target SRS resource is allowed to be configured in the plurality of SRS resource sets. For example, if the quantity of antenna panels associated with the downlink beam report is 1, it is determined that the target SRS resource is allowed to be configured in the plurality of SRS resource sets; or if the quantity of antenna panels associated with the downlink beam report is greater than 1, it is determined that the target SRS resource is not allowed to be configured in the plurality of SRS resource sets.

Alternatively, for another example, if the SRS is an aperiodic SRS, it is determined, based on the usage of the SRS and the relationship between the SRS and the reference RS that is used to determine the spatial relationship information of the target channel or the target signal, whether the target SRS is allowed to be configured in the plurality of SRS resource sets. In this case, if the usage of the SRS is one of codebook-based transmission, non-codebook-based transmission, or antenna switching and the reference RS that is used to determine the spatial relationship information of the target channel or the target signal does not include the SRS, it is determined that the target SRS resource is allowed to be configured in the plurality of SRS resource sets; otherwise, it is determined that the target SRS resource is not allowed to be configured in the plurality of SRS resource sets.

Alternatively, if the SRS is an aperiodic SRS, it is determined, based on the usage of the SRS and the type of the reference RS that is used to determine the spatial relationship information of the SRS, whether the target SRS resource is allowed to be configured in the plurality of SRS resource sets. In this case, if the usage of the SRS is one of codebook-based transmission, non-codebook-based transmission, or antenna switching and the reference RS that is used to determine the spatial relationship information of the SRS is a synchronization signal block SSB or a channel state information-reference signal CSI-RS, it is determined that the target SRS resource is allowed to be configured in the plurality of SRS resource sets; otherwise, it is determined that the target SRS resource is not allowed to be configured in the plurality of SRS resource sets.

Alternatively, if the SRS is an aperiodic SRS, it is determined, based on the usage of the SRS and the downlink beam report, that the target SRS resource is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the SRS is an aperiodic SRS, it is determined, based on the relationship between the SRS and the reference RS that is used to determine the spatial relationship information of the target channel or the target signal and the type of the reference RS that is used to determine the spatial relationship information of the SRS, whether the target SRS is allowed to be configured in the plurality of SRS resource sets. In this case, if the reference RS that is used to determine the spatial relationship information of the target channel or the target signal does not include the SRS and the reference RS that is used to determine the spatial relationship information of the SRS is a synchronization signal block SSB or a channel state information-reference signal CSI-RS, it is determined that the target SRS resource is allowed to be configured in the plurality of SRS resource sets; otherwise, it is determined that the target SRS resource is not allowed to be configured in the plurality of SRS resource sets.

Alternatively, if the SRS is an aperiodic SRS, it is determined, based on the relationship between the SRS and the reference RS that is used to determine the spatial relationship information of the target channel or the target signal and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the SRS is an aperiodic SRS, it is determined, based on the type of the reference RS that is used to determine the spatial relationship information of the SRS and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the SRS is an aperiodic SRS, it is determined, based on the usage of the SRS, the relationship between the SRS and the reference RS that is used to determine the spatial relationship information of the target channel or the target signal, and the type of the reference RS that is used to determine the spatial relationship information of the SRS, whether the target SRS is allowed to be configured in the plurality of SRS resource sets. In this case, if the usage of the SRS is one of codebook-based transmission, non-codebook-based transmission, or antenna switching, the reference RS that is used to determine the spatial relationship information of the target channel or the target signal does not include the SRS, and the reference RS that is used to determine the spatial relationship information of the SRS is a synchronization signal block SSB or a channel state information-reference signal CSI-RS, it is determined that the target SRS resource is allowed to be configured in the plurality of SRS resource sets; otherwise, it is determined that the target SRS resource is not allowed to be configured in the plurality of SRS resource sets.

Alternatively, if the SRS is an aperiodic SRS, it is determined, based on the usage of the SRS, the relationship between the SRS and the reference RS that is used to determine the spatial relationship information of the target channel or the target signal, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the SRS is an aperiodic SRS, it is determined, based on the usage of the SRS, the type of the reference RS that is used to determine the spatial relationship information of the SRS, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the SRS is an aperiodic SRS, it is determined, based on the relationship between the SRS and the reference RS that is used to determine the spatial relationship information of the target channel or the target signal, the type of the reference RS that is used to determine the spatial relationship information of the SRS, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the SRS is an aperiodic SRS, it is determined, based on the usage of the SRS, the relationship between the SRS and the reference RS that is used to determine the spatial relationship information of the target channel or the target signal, the type of the reference RS that is used to determine the spatial relationship information of the SRS, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

It should be noted that the foregoing example of determining, based on at least one of the usage of the SRS, the relationship between the SRS and the reference RS that is used to determine the spatial relationship information of the target channel or the target signal, the type of the reference RS that is used to determine the spatial relationship information of the SRS, or the downlink beam report, whether the target SRS resource is allowed to be configured in the plurality of SRS resource sets is merely intended to enable a person skilled in the art to understand the technical solutions of the embodiments of the present disclosure, and not to limit a protection range.

Example e

The information about the SRS includes the relationship between the SRS and the reference RS that is used to determine the spatial relationship information of the target channel or the target signal. In this case, if the reference RS that is used to determine the spatial relationship information of the target channel or the target signal includes the SRS, it is determined that the target SRS resource is not allowed to be configured in the plurality of SRS resource sets; or if the reference RS that is used to determine the spatial relationship information of the target channel or the target signal does not include the SRS, it is determined that the target SRS resource is allowed to be configured in the plurality of SRS resource sets.

It should be noted that, that the reference RS that is used to determine the spatial relationship information of the target channel or the target signal includes the SRS in Example e may be understood as that the SRS is configured as the reference RS that is used to determine the spatial relationship information of the target channel or the target signal.

Example f

The information about the SRS includes the relationship between the SRS and the reference RS that is used to determine the spatial relationship information of the target channel or the target signal. In this case, if the reference RS that is used to determine the spatial relationship information of the target channel or the target signal includes the SRS, it is determined that the target SRS resource is not allowed to be configured in the plurality of SRS resource sets; or if the reference RS that is used to determine the spatial relationship information of the target channel or the target signal does not include the SRS, it is determined, based on at least one of the usage of the SRS, the time domain characteristic of the SRS, the type of the reference RS that is used to determine the spatial relationship information of the SRS, or the downlink beam report, whether the target SRS resource is allowed to be configured in the plurality of SRS resource sets.

For example, if the reference RS that is used to determine the spatial relationship information of the target channel or the target signal does not include the SRS, it is determined, based on the usage of the SRS, that the target SRS resource is allowed to be configured in the plurality of SRS resource sets. In this case, if the usage of the SRS is one of codebook-based transmission, non-codebook-based transmission, or antenna switching, it is determined that the target SRS resource is allowed to be configured in the plurality of SRS resource sets; or if the usage of the SRS is beam management, it is determined that the target SRS is not allowed to be configured in the plurality of SRS resource sets.

Alternatively, for another example, if the reference RS that is used to determine the spatial relationship information of the target channel or the target signal does not include the SRS, it is determined, based on the time domain characteristic of the SRS, whether the target SRS resource is allowed to be configured in the plurality of SRS resource sets. In this case, if the SRS is a periodic SRS or a semi-periodic SRS, it is determined that the target SRS resource is not allowed to be configured in the plurality of SRS resource sets; or if the SRS is an aperiodic SRS, it is determined that the target SRS resource is allowed to be configured in the plurality of SRS resource sets.

Alternatively, for another example, if the reference RS that is used to determine the spatial relationship information of the target channel or the target signal does not include the SRS, it is determined, based on the type of the reference RS that is used to determine the spatial relationship information of the SRS, whether the target SRS is allowed to be configured in the plurality of SRS resource sets. In this case, if the reference RS that is used to determine the spatial relationship information of the SRS is an SRS, it is determined that the target SRS resource is not allowed to be configured in the plurality of SRS resource sets; or if the reference RS that is used to determine the spatial relationship information of the SRS is a synchronization signal block SSB or a channel state information-reference signal CSI-RS, it is determined that the target SRS resource is allowed to be configured in the plurality of SRS resource sets.

Alternatively, for another example, if the reference RS that is used to determine the spatial relationship information of the target channel or the target signal does not include the SRS, it is determined, based on the downlink beam report, whether the target SRS resource is allowed to be configured in the plurality of SRS resource sets. In this case, if the downlink beam report is not associated with an antenna panel of the terminal device or the downlink beam report is not received before the configuration information is sent, it is determined that the target SRS resource is not allowed to be configured in the plurality of SRS resource sets; or if the downlink beam report is associated with the antenna panel of the terminal device, it is determined, based on a quantity of antenna panels associated with the downlink report, whether the target SRS resource is allowed to be configured in the plurality of SRS resource sets. For example, if the quantity of antenna panels associated with the downlink beam report is 1, it is determined that the target SRS resource is allowed to be configured in the plurality of SRS resource sets; or if the quantity of antenna panels associated with the downlink beam report is greater than 1, it is determined that the target SRS resource is not allowed to be configured in the plurality of SRS resource sets.

Alternatively, for another example, if the reference RS that is used to determine the spatial relationship information of the target channel or the target signal does not include the SRS, it is determined, based on the usage of the SRS and the time domain characteristic of the SRS, whether the target SRS resource is allowed to be configured in the plurality of SRS resource sets. In this case, if the usage of the SRS is one of codebook-based transmission, non-codebook-based transmission, or antenna switching and the SRS is an aperiodic SRS, it is determined that the target SRS resource is allowed to be configured in the plurality of SRS resource sets; otherwise, it is determined that the target SRS is not allowed to be configured in the plurality of SRS resource sets.

Alternatively, if the reference RS that is used to determine the spatial relationship information of the target channel or the target signal does not include the SRS, it is determined, based on the usage of the SRS and the type of the reference RS that is used to determine the spatial relationship information of the SRS, whether the target SRS resource is allowed to be configured in the plurality of SRS resource sets. In this case, if the usage of the SRS is one of codebook-based transmission, non-codebook-based transmission, or antenna switching and the reference RS that is used to determine the spatial relationship information of the SRS is a synchronization signal block SSB or a channel state information-reference signal CSI-RS, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the target channel or the target signal does not include the SRS, it is determined, based on the usage of the SRS and the downlink beam report, whether the target SRS resource is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the reference RS that is used to determine the spatial relationship information of the target channel or the target signal does not include the SRS, it is determined, based on the time domain characteristic of the SRS and the type of the reference RS that is used to determine the spatial relationship information of the SRS, whether the target SRS is allowed to be configured in the plurality of SRS resource sets. In this case, if the SRS is an aperiodic SRS and the reference RS that is used to determine the spatial relationship information of the SRS is a synchronization signal block SSB or a channel state information-reference signal CSI-RS, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the target channel or the target signal does not include the SRS, it is determined, based on the time domain characteristic of the SRS and the downlink beam report, whether the target SRS resource is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the target channel or the target signal does not include the SRS, it is determined, based on the type of the reference RS that is used to determine the spatial relationship information of the SRS and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the reference RS that is used to determine the spatial relationship information of the target channel or the target signal does not include the SRS, it is determined, based on the usage of the SRS, the time domain characteristic of the SRS, and the type of the reference RS that is used to determine the spatial relationship information of the SRS, whether the target SRS is allowed to be configured in the plurality of SRS resource sets. In this case, if the usage of the SRS is one of codebook-based transmission, non-codebook-based transmission, or antenna switching, the SRS is an aperiodic SRS, and the reference RS that is used to determine the spatial relationship information of the SRS is a synchronization signal block SSB or a channel state information-reference signal CSI-RS, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the target channel or the target signal does not include the SRS, it is determined, based on the usage of the SRS, the time domain characteristic of the SRS, and the downlink beam report, whether the target SRS resource is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the target channel or the target signal does not include the SRS, it is determined, based on the usage of the SRS, the type of the reference RS that is used to determine the spatial relationship information of the SRS, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the target channel or the target signal does not include the SRS, it is determined, based on the time domain characteristic of the SRS, the type of the reference RS that is used to determine the spatial relationship information of the SRS, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the reference RS that is used to determine the spatial relationship information of the target channel or the target signal does not include the SRS, it is determined, based on the usage of the SRS, the time domain characteristic of the SRS, the type of the reference RS that is used to determine the spatial relationship information of the SRS, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

It should be noted that the foregoing example of determining, based on at least one of the usage of the SRS, the time domain characteristic of the SRS, the type of the reference RS that is used to determine the spatial relationship information of the SRS, or the downlink beam report, whether the target SRS resource is allowed to be configured in the plurality of SRS resource sets is merely intended to enable a person skilled in the art to understand the technical solutions of the embodiments of the present disclosure, and not to limit a protection range.

Example g

The target information includes the type of the reference RS that is used to determine the spatial relationship information of the SRS. In this case, if the reference RS that is used to determine the spatial relationship information of the SRS is an SRS, it is determined that the target SRS resource is not allowed to be configured in the plurality of SRS resource sets; or if the reference RS that is used to determine the spatial relationship information of the SRS is a synchronization signal block SSB or a channel state information-reference signal CSI-RS, it is determined that the target SRS resource is allowed to be configured in the plurality of SRS resource sets.

Example h

The target information includes the type of the reference RS that is used to determine the spatial relationship information of the SRS. In this case, if the reference RS that is used to determine the spatial relationship information of the SRS is an SRS, it is determined that the target SRS resource is not allowed to be configured in the plurality of SRS resource sets; or if the reference RS that is used to determine the spatial relationship information of the SRS is an SSB or a CSI-RS, it is determined, based on at least one of the usage of the SRS, the time domain characteristic of the SRS, the relationship between the SRS and the reference RS that is used to determine the spatial relationship information of the target channel or the target signal, or the downlink beam report, whether the target SRS resource is allowed to be configured in the plurality of SRS resource sets.

For example, if the reference RS that is used to determine the spatial relationship information of the SRS is an SSB or a CSI-RS, it is determined, based on the usage of the SRS, whether the target SRS is allowed to be configured in the plurality of SRS resource sets. In this case, if the usage of the SRS is one of codebook-based transmission, non-codebook-based transmission, or antenna switching, it is determined that the target SRS resource is allowed to be configured in the plurality of SRS resource sets; or if the usage of the SRS is beam management, it is determined that the target SRS is not allowed to be configured in the plurality of SRS resource sets.

Alternatively, for another example, if the reference RS that is used to determine the spatial relationship information of the SRS is an SSB or a CSI-RS, it is determined, based on the time domain characteristic of the SRS, whether the target SRS is allowed to be configured in the plurality of SRS resource sets. In this case, if the SRS is a periodic SRS or a semi-periodic SRS, it is determined that the target SRS resource is not allowed to be configured in the plurality of SRS resource sets; or if the SRS is an aperiodic SRS, it is determined that the target SRS resource is allowed to be configured in the plurality of SRS resource sets.

Alternatively, for another example, if the reference RS that is used to determine the spatial relationship information of the SRS is an SSB or a CSI-RS, it is determined, based on the relationship between the SRS and the reference RS that is used to determine the spatial relationship information of the target channel or the target signal, whether the target SRS is allowed to be configured in the plurality of SRS resource sets. In this case, if the reference RS that is used to determine the spatial relationship information of the target channel or the target signal includes the SRS, it is determined that the target SRS resource is not allowed to be configured in the plurality of SRS resource sets; or if the reference RS that is used to determine the spatial relationship information of the target channel or the target signal does not include the SRS, it is determined that the target SRS resource is allowed to be configured in the plurality of SRS resource sets.

Alternatively, for another example, if the reference RS that is used to determine the spatial relationship information of the SRS is an SSB or a CSI-RS, it is determined, based on the downlink beam report, whether the target SRS is allowed to be configured in the plurality of SRS resource sets. In this case, if the downlink beam report is not associated with an antenna panel of the terminal device or the downlink beam report is not received before the configuration information is sent, it is determined that the target SRS resource is not allowed to be configured in the plurality of SRS resource sets; or if the downlink beam report is associated with the antenna panel of the terminal device, it is determined, based on a quantity of antenna panels associated with the downlink report, whether the target SRS resource is allowed to be configured in the plurality of SRS resource sets. For example, if the quantity of antenna panels associated with the downlink beam report is 1, it is determined that the target SRS resource is allowed to be configured in the plurality of SRS resource sets; or if the quantity of antenna panels associated with the downlink beam report is greater than 1, it is determined that the target SRS resource is not allowed to be configured in the plurality of SRS resource sets.

Alternatively, for another example, if the reference RS that is used to determine the spatial relationship information of the SRS is an SSB or a CSI-RS, it is determined, based on the usage of the SRS and the time domain characteristic of the SRS, whether the target SRS is allowed to be configured in the plurality of SRS resource sets. In this case, if the usage of the SRS is one of codebook-based transmission, non-codebook-based transmission, or antenna switching and the SRS is an aperiodic SRS, it is determined that the target SRS resource is allowed to be configured in the plurality of SRS resource sets; otherwise, it is determined that the target SRS is not allowed to be configured in the plurality of SRS resource sets.

Alternatively, if the reference RS that is used to determine the spatial relationship information of the SRS is an SSB or a CSI-RS, it is determined, based on the usage of the SRS and the relationship between the SRS and the reference RS that is used to determine the spatial relationship information of the target channel or the target signal, whether the target SRS resource is allowed to be configured in the plurality of SRS resource sets. In this case, if the usage of the SRS is one of codebook-based transmission, non-codebook-based transmission, or antenna switching and the reference RS that is used to determine the spatial relationship information of the target channel or the target signal does not include the SRS, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the SRS is an SSB or a CSI-RS, it is determined, based on the usage of the SRS and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the reference RS that is used to determine the spatial relationship information of the SRS is an SSB or a CSI-RS, it is determined, based on the time domain characteristic of the SRS and the relationship between the SRS and the reference RS that is used to determine the spatial relationship information of the target channel or the target signal, whether the target SRS is allowed to be configured in the plurality of SRS resource sets. In this case, if the SRS is an aperiodic SRS and the reference RS that is used to determine the spatial relationship information of the target channel or the target signal does not include the SRS, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the SRS is an SSB or a CSI-RS, it is determined, based on the time domain characteristic of the SRS and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the SRS is an SSB or a CSI-RS, it is determined, based on the relationship between the SRS and the reference RS that is used to determine the spatial relationship information of the target channel or the target signal and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the reference RS that is used to determine the spatial relationship information of the SRS is an SSB or a CSI-RS, it is determined, based on the usage of the SRS, the time domain characteristic of the SRS, and the relationship between the SRS and the reference RS that is used to determine the spatial relationship information of the target channel or the target signal, whether the target SRS is allowed to be configured in the plurality of SRS resource sets. In this case, if the usage of the SRS is one of codebook-based transmission, non-codebook-based transmission, or antenna switching, the SRS is an aperiodic SRS, and the reference RS that is used to determine the spatial relationship information of the target channel or the target signal does not include the SRS, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the SRS is an SSB or a CSI-RS, it is determined, based on the usage of the SRS, the time domain characteristic of the SRS, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the SRS is an SSB or a CSI-RS, it is determined, based on the usage of the SRS, the relationship between the SRS and the reference RS that is used to determine the spatial relationship information of the target channel or the target signal, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, if the reference RS that is used to determine the spatial relationship information of the target channel or the target signal does not include the SRS, it is determined, based on the time domain characteristic of the SRS, the relationship between the SRS and the reference RS that is used to determine the spatial relationship information of the target channel or the target signal, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

Alternatively, for another example, if the reference RS that is used to determine the spatial relationship information of the target channel or the target signal does not include the SRS, it is determined, based on the usage of the SRS, the time domain characteristic of the SRS, the relationship between the SRS and the reference RS that is used to determine the spatial relationship information of the target channel or the target signal, and the downlink beam report, whether the target SRS is allowed to be configured in the plurality of SRS resource sets. In this case, if the quantity of antenna panels associated with the downlink beam report is 1, it is determined that the target SRS resource is allowed to be configured in the plurality of SRS resource sets; otherwise, it is determined that the target SRS resource is not allowed to be configured in the plurality of SRS resource sets.

It should be noted that the foregoing example of determining, based on at least one of the usage of the SRS, the time domain characteristic of the SRS, the relationship between the SRS and the reference RS that is used to determine the spatial relationship information of the target channel or the target signal, or the downlink beam report, whether the target SRS resource is allowed to be configured in the plurality of SRS resource sets is merely intended to enable a person skilled in the art to understand the technical solutions of the embodiments of the present disclosure, and not to limit a protection range.

Example i

The target information includes the downlink beam report. In this case, if the downlink beam report is not associated with an antenna panel of the terminal device or the downlink beam report is not received before the configuration information is sent, it is determined that the target SRS resource is not allowed to be configured in the plurality of SRS resource sets; or if the downlink beam report is associated with the antenna panel of the terminal device, it is determined, based on a quantity of antenna panels associated with the downlink report, whether the target SRS resource is allowed to be configured in the plurality of SRS resource sets.

Specifically, in some embodiments, if the quantity of antenna panels associated with the downlink beam report is 1, it is determined that the target SRS resource is allowed to be configured in the plurality of SRS resource sets; or if the quantity of antenna panels associated with the downlink beam report is greater than 1, it is determined that the target SRS resource is not allowed to be configured in the plurality of SRS resource sets.

It should be noted that if the quantity of antenna panels associated with the downlink beam report is 1, regardless of whether the usage of the SRS is one of codebook-based transmission, non-codebook-based transmission, and antenna switching, whether the SRS is an aperiodic SRS, whether the reference RS that is used to determine the spatial relationship information of the target channel or the target signal includes the SRS, or whether the reference RS that is used to determine the spatial relationship information of the SRS is an SSB or a CSI-RS, it is considered that a same SRS resource is allowed to be configured in the plurality of SRS resource sets.

Alternatively, specifically, in some other embodiments, if the quantity of antenna panels associated with the downlink beam report is 1, it is determined that the target SRS resource is allowed to be configured in the plurality of SRS resource sets; or if the quantity of antenna panels associated with the downlink beam report is greater than 1, it is determined, based on the information about the SRS, whether the target SRS resource is allowed to be configured in the plurality of SRS resource sets.

Herein, the information about the SRS includes at least one piece of the following information: a usage of the SRS; a time domain characteristic of the SRS; a relationship between the SRS and a reference RS that is used to determine spatial relationship information of a target channel or a target signal; and a type of a reference RS that is used to determine spatial relationship information of the SRS.

Based on all the foregoing embodiments, the method shown in FIG. 1 further includes: receiving an SRS corresponding to the target SRS resource, where the SRS is sent by the terminal device by using N antenna panels associated with the M SRS resource sets, and N is a positive integer greater than or equal to 1 and less than or equal to M.

The terminal device sends an SRS by using an antenna panel associated with an SRS resource set, to avoid a problem that communication validity is affected because the terminal device does not determine which antenna panel or antenna panels are used to send an SRS.

For example, after the terminal device receives the configuration information, the terminal device establishes an association relationship between the M SRS resource sets and an antenna panel, and sends the SRS corresponding to the target SRS resource by using an antenna panel associated with an SRS resource set in which the target SRS resource is located. Herein, an association relationship between an SRS resource set and an antenna panel may be a one-to-one relationship, or may be a many-to-one relationship.

For example, the network device configures a same SRS resource in an SRS resource set 1 and an SRS resource set 3 in the SRS resource set 1, an SRS resource set 2, and the SRS resource set 3. The SRS resource set 1 is associated with a panel 1, the SRS resource set 2 is associated with a panel 3, and the SRS resource set 3 is associated with a panel 2. When sending an SRS corresponding to the SRS resource, the terminal device sends the SRS simultaneously by using the panel 1 and the panel 2.

Optionally, in some embodiments, before sending the configuration information to the terminal device, the network device does not need to determine whether a same SRS resource is allowed to be configured in the plurality of SRS resource sets. In this case, as shown in FIG. 2, the method shown in FIG. 1 further includes:

S120. Determine a quantity of antenna panels that are used by the terminal device to send an SRS corresponding to the target SRS resource.

S130. If the quantity of antenna panels that are used by the terminal device to send the SRS corresponding to the target SRS resource is 1, receive an SRS that is sent by the terminal device by using an antenna panel associated with a target SRS resource set in the M SRS resource sets, where the target SRS resource set is randomly determined by the terminal device from the M SRS resource sets or the target SRS resource set meets a preset rule.

It may be understood that in S130, there is one target SRS resource set and one antenna panel corresponding to the target SRS resource set.

Optionally, in S120, it is determined, based on a target condition, the quantity of antenna panels that are used by the terminal device to send the SRS corresponding to the target SRS resource; and if the target condition is met, it is determined that the quantity of antenna panels that are used by the terminal device to send the SRS corresponding to the target SRS resource is 1, where the target condition includes a first preset condition, and the first preset condition includes at least one of the following conditions: a usage of the SRS corresponding to the target SRS resource is beam management; the SRS corresponding to the target SRS resource is a periodic SRS or a semi-periodic SRS; a reference RS that is used to determine spatial relationship information of a target channel or a target signal includes the SRS corresponding to the target SRS resource; or a reference RS that is used to determine spatial relationship information of the SRS corresponding to the target SRS resource is an SRS.

Further, the target condition further includes a second preset condition, and the second preset condition includes at least one of the following conditions: the terminal device does not report a downlink beam report before the configuration information is sent; a downlink beam report reported by the terminal device is not associated with an antenna panel of the terminal device; or a downlink beam report reported by the terminal device is associated with a plurality of antenna panels of the terminal device.

That is, if the target condition is met, the terminal device randomly selects one SRS resource set from the M SRS resource sets, and sends the SRS by using an antenna panel corresponding to the SRS resource set. Alternatively, the terminal device sends the SRS by using an antenna panel corresponding to an SRS resource set that meets the preset rule and that is in the M SRS resource sets. The terminal device can determine which antenna panel or antenna panels are specifically used to send the SRS, so that a problem that communication validity is affected because the terminal device does not determine which antenna panel or antenna panels are used to send the SRS.

The preset rule may be one of the following rules: having a minimum set identifier; having a maximum set identifier; being associated with an antenna panel corresponding to a beam with best signal quality in a downlink beam report; being associated with spatial relationship information of a physical uplink control channel PUCCH; being associated with PUCCH configuration information other than the spatial relationship information of the PUCCH; being associated with spatial relationship information of a physical uplink shared channel (PUSCH); or being associated with PUSCH configuration information other than the spatial relationship information of the PUSCH.

In this embodiment of the present disclosure, signal quality of a beam may be represented by reference signal received power (RSRP), reference signal received quality (RSRQ), or a signal to interference plus noise ratio (SINR).

In this embodiment of the present disclosure, a plurality of SRS resource sets may be associated with spatial relationship information of a physical uplink control channel (PUCCH). In this case, the target SRS resource set in S130 may be an SRS resource set with a maximum set identifier or an SRS resource set with a minimum set identifier in the SRS resource sets associated with the spatial relationship information of the PUCCH. Similarly, in a case that a plurality of SRS resource sets are associated with PUCCH configuration information other than the spatial relationship information of the PUCCH, the target SRS resource set may be an SRS resource set with a maximum set identifier or an SRS resource set with a minimum set identifier in the SRS resource sets associated with the PUCCH configuration information other than the spatial relationship information of the PUCCH. In a case that a plurality of SRS resource sets are associated with the spatial relationship information of the PUSCH, the target SRS resource set may be an SRS resource set with a maximum set identifier or an SRS resource set with a minimum set identifier in the SRS resource sets associated with the spatial relationship information of the PUSCH. In a case that a plurality of SRS resource sets are associated with PUSCH configuration information other than the spatial relationship information of the PUSCH, the target SRS resource set may be an SRS resource set with a maximum set identifier or an SRS resource set with a minimum set identifier in the SRS resource sets associated with the PUSCH configuration information other than the spatial relationship information of the PUSCH.

The resource configuration methods according to the embodiments of this application are described above in detail with reference to FIG. 1 to FIG. 2. A resource configuration method according to another embodiment of the present disclosure is described in detail below with reference to FIG. 3. It should be noted that interaction between a terminal device and a network device described on the terminal device side is the same as that described on the network device side. To avoid repetition, related descriptions are appropriately omitted.

FIG. 3 shows a resource configuration method according to another embodiment of the present disclosure. As shown in FIG. 3, the method includes:

S210. Receive configuration information, where the configuration information is used to configure a target SRS resource in M SRS resource sets, and M is a positive integer greater than or equal to 2.

Optionally, in an embodiment, the configuration information is sent in a case that a network device determines, based on target information, that the target SRS resource is allowed to be configured in a plurality of SRS resource sets.

Optionally, in an embodiment, the target information includes at least one of information about an SRS corresponding to the target SRS resource or a downlink beam report.

Optionally, in an embodiment, the information about the SRS includes at least one piece of the following information:

a usage of the SRS;

a time domain characteristic of the SRS;

a relationship between the SRS and a reference RS that is used to determine spatial relationship information of a target channel or a target signal; or a type of a reference RS that is used to determine spatial relationship information of the SRS.

Optionally, in an embodiment, the method shown in FIG. 3 further includes: sending an SRS corresponding to the target SRS resource to the network device by using N antenna panels associated with the M SRS resource sets, where N is a positive integer greater than or equal to 1 and less than or equal to M.

The terminal device sends an SRS by using an antenna panel associated with an SRS resource set, to avoid a problem that communication validity is affected because the terminal device does not determine which antenna panel or antenna panels are used to send an SRS.

Optionally, in an embodiment, the method shown in FIG. 3 further includes: determining a quantity of antenna panels that are used to send an SRS corresponding to the target SRS resource; and if the quantity of antenna panels that are used to send the SRS corresponding to the target SRS resource is 1, sending the SRS corresponding to the target SRS resource by using an antenna panel associated with a target SRS resource set in the M SRS resource sets, where the target SRS resource set is randomly determined by the terminal device from the M SRS resource sets or the target SRS resource set meets a preset rule.

Optionally, in an embodiment, the preset rule is one of the following rules:

having a minimum set identifier;

having a maximum set identifier;

being associated with an antenna panel corresponding to a beam with best signal quality in a downlink beam report;

being associated with spatial relationship information of a physical uplink control channel PUCCH;

being associated with PUCCH configuration information other than the spatial relationship information of the PUCCH;

being associated with spatial relationship information of a physical uplink shared channel PUSCH; or being associated with PUSCH configuration information other than the spatial relationship information of the PUSCH.

Optionally, in an embodiment, the determining a quantity of antenna panels that are used by to send an SRS corresponding to the target SRS resource includes: determining, based on a target condition, the quantity of antenna panels that are used to send the SRS corresponding to the target SRS resource; and if the target condition is met, determining that the quantity of antenna panels that are used to send the SRS corresponding to the target SRS resource is 1, where the target condition includes a first preset condition, and the first preset condition includes at least one of the following conditions:

a usage of the SRS corresponding to the target SRS resource is beam management;

the SRS corresponding to the target SRS resource is a periodic SRS or a semi-periodic SRS;

a reference RS that is used to determine spatial relationship information of a target channel or a target signal includes the SRS corresponding to the target SRS resource; or a reference RS that is used to determine spatial relationship information of the SRS corresponding to the target SRS resource is an SRS.

Optionally, in an embodiment, the target condition further includes a second preset condition, and the second preset condition includes at least one of the following conditions:

a downlink beam report is not reported before the configuration information is received;

a reported downlink beam report is not associated with an antenna panel of the terminal device; or a reported downlink beam report is associated with a plurality of antenna panels of the terminal device.

That is, if the target condition is met, the terminal device randomly selects one SRS resource set from the M SRS resource sets, and sends the SRS by using an antenna panel corresponding to the SRS resource set. Alternatively, the terminal device sends the SRS by using an antenna panel corresponding to an SRS resource set that meets the preset rule and that is in the M SRS resource sets. The terminal device can determine which antenna panel or antenna panels are specifically used to send the SRS, so that a problem that communication validity is affected because the terminal device does not determine which antenna panel or antenna panels are used to send the SRS.

The preset rule may be one of the following rules: having a minimum set identifier; having a maximum set identifier; being associated with an antenna panel corresponding to a beam with best signal quality in a downlink beam report; being associated with spatial relationship information of a physical uplink control channel PUCCH; being associated with PUCCH configuration information other than the spatial relationship information of the PUCCH; being associated with spatial relationship information of a physical uplink shared channel PUSCH; or being associated with PUSCH configuration information other than the spatial relationship information of the PUSCH.

In this embodiment of the present disclosure, signal quality of a beam may be represented by reference signal received power (RSRP), reference signal received quality (RSRQ), or a signal to interference plus noise ratio (SINR).

In this embodiment of the present disclosure, a plurality of SRS resource sets may be associated with spatial relationship information of a physical uplink control channel (PUCCH). In this case, the target SRS resource set in S130 may be an SRS resource set with a maximum set identifier or an SRS resource set with a minimum set identifier in the SRS resource sets associated with the spatial relationship information of the PUCCH. Similarly, in a case that a plurality of SRS resource sets are associated with PUCCH configuration information other than the spatial relationship information of the PUCCH, the target SRS resource set may be an SRS resource set with a maximum set identifier or an SRS resource set with a minimum set identifier in the SRS resource sets associated with the PUCCH configuration information other than the spatial relationship information of the PUCCH. In a case that a plurality of SRS resource sets are associated with the spatial relationship information of the PUSCH, the target SRS resource set may be an SRS resource set with a maximum set identifier or an SRS resource set with a minimum set identifier in the SRS resource sets associated with the spatial relationship information of the PUSCH. In a case that a plurality of SRS resource sets are associated with PUSCH configuration information other than the spatial relationship information of the PUSCH, the target SRS resource set may be an SRS resource set with a maximum set identifier or an SRS resource set with a minimum set identifier in the SRS resource sets associated with the PUSCH configuration information other than the spatial relationship information of the PUSCH.

Optionally, in an embodiment, the method shown in FIG. 3 further includes: establishing an association relationship between the M SRS resource sets and an antenna panel.

For example, after the terminal device receives the configuration information, the terminal device establishes an association relationship between the M SRS resource sets and an antenna panel, and sends the SRS corresponding to the target SRS resource by using an antenna panel associated with an SRS resource set in which the target SRS resource is located. Herein, an association relationship between an SRS resource set and an antenna panel may be a one-to-one relationship, or may be a many-to-one relationship.

The resource configuration methods according to the embodiments of this application are described above in detail with reference to FIG. 1 to FIG. 3. A network device according to an embodiment of this application is described below in detail with reference to FIG. 4.

FIG. 4 is a schematic structural diagram of a network device according to an embodiment of the present disclosure. As shown in FIG. 4, a network device 40 includes:
a transceiver module 41, configured to send configuration information to a terminal device, where the configuration information is used to configure a target SRS resource in M SRS resource sets, and M is a positive integer greater than or equal to 2.

Optionally, in an embodiment, the transceiver module 41 is specifically configured to:
determine, based on target information, whether the target SRS resource is allowed to be configured in a plurality of SRS resource sets; and
send the configuration information to the terminal device if the target SRS resource is allowed to be configured in the plurality of SRS resource sets.

Optionally, in an embodiment, the target information includes at least one of information about an SRS corresponding to the target SRS resource or a downlink beam report.

Optionally, in an embodiment, the information about the SRS includes at least one piece of the following information:
a usage of the SRS;
a time domain characteristic of the SRS;
a relationship between the SRS and a reference RS that is used to determine spatial relationship information of a target channel or a target signal; or
a type of a reference RS that is used to determine spatial relationship information of the SRS.

Optionally, in an embodiment, the information about the SRS includes the usage of the SRS; and the transceiver module 41 is specifically configured to:
if the usage of the SRS is beam management, determine that the target SRS resource is not allowed to be configured in the plurality of SRS resource sets; or
if the usage of the SRS is one of codebook-based transmission, non-codebook-based transmission, or antenna switching, determine that the target SRS resource is allowed to be configured in the plurality of SRS resource sets.

Optionally, in an embodiment, the information about the SRS includes the usage of the SRS; and the transceiver module 41 is specifically configured to:
if the usage of the SRS is beam management, determine that the target SRS resource is not allowed to be configured in the plurality of SRS resource sets; or
if the usage of the SRS is one of codebook-based transmission, non-codebook-based transmission, or antenna switching, determine, based on at least one of the time domain characteristic of the SRS, the relationship between the SRS and the reference RS that is used to determine the spatial relationship information of the target channel or the target signal, the type of the reference RS that is used to determine the spatial relationship information of the SRS, and the downlink beam report, whether the target SRS resource is allowed to be configured in the plurality of SRS resource sets.

Optionally, in an embodiment, the information about the SRS includes the time domain characteristic of the SRS; and the transceiver module 41 is specifically configured to:
if the SRS is a periodic SRS or a semi-periodic SRS, determine that the target SRS resource is not allowed to be configured in the plurality of SRS resource sets; or
if the SRS is an aperiodic SRS, determine that the target SRS resource is allowed to be configured in the plurality of SRS resource sets.

Optionally, in an embodiment, the information about the SRS includes the time domain characteristic of the SRS; and the transceiver module 41 is specifically configured to:
if the SRS is a periodic SRS or a semi-periodic SRS, determine that the target SRS resource is not allowed to be configured in the plurality of SRS resource sets; or
if the SRS is an aperiodic SRS, determine, based on at least one of the usage of the SRS, the relationship between the SRS and the reference RS that is used to determine the spatial relationship information of the target channel or the target signal, the type of the reference RS that is used to determine the spatial relationship information of the SRS, or the downlink beam report, whether the target SRS resource is allowed to be configured in the plurality of SRS resource sets.

Optionally, in an embodiment, the information about the SRS includes the relationship between the SRS and the reference RS that is used to determine the spatial relationship information of the target channel or the target signal; and the transceiver module 41 is specifically configured to:
   if the reference RS that is used to determine the spatial relationship information of the target channel or the target signal includes the SRS, determine that the target SRS resource is not allowed to be configured in the plurality of SRS resource sets; or
   if the reference RS that is used to determine the spatial relationship information of the target channel or the target signal does not include the SRS, determine that the target SRS resource is allowed to be configured in the plurality of SRS resource sets.

Optionally, in an embodiment, the information about the SRS includes the relationship between the SRS and the reference RS that is used to determine the spatial relationship information of the target channel or the target signal; and the transceiver module 41 is specifically configured to:
   if the reference RS that is used to determine the spatial relationship information of the target channel or the target signal includes the SRS, determine that the target SRS resource is not allowed to be configured in the plurality of SRS resource sets; or
   if the reference RS that is used to determine the spatial relationship information of the target channel or the target signal does not include the SRS, determine, based on at least one of the usage of the SRS, the time domain characteristic of the SRS, the type of the reference RS that is used to determine the spatial relationship information of the SRS, or the downlink beam report, whether the target SRS resource is allowed to be configured in the plurality of SRS resource sets.

Optionally, in an embodiment, the target information includes the type of the reference RS that is used to determine the spatial relationship information of the SRS; and the transceiver module 41 is specifically configured to:
   if the reference RS that is used to determine the spatial relationship information of the SRS is an SRS, determine that the target SRS resource is not allowed to be configured in the plurality of SRS resource sets; or
   if the reference RS that is used to determine the spatial relationship information of the SRS is a synchronization signal block SSB or a channel state information-reference signal CSI-RS, determine that the target SRS resource is allowed to be configured in the plurality of SRS resource sets.

Optionally, in an embodiment, the target information includes the type of the reference RS that is used to determine the spatial relationship information of the SRS; and the transceiver module 41 is specifically configured to:
   if the reference RS that is used to determine the spatial relationship information of the SRS is an SRS, determine that the target SRS resource is not allowed to be configured in the plurality of SRS resource sets; or
   if the reference RS that is used to determine the spatial relationship information of the SRS is an SSB or a CSI-RS, determine, based on at least one of the usage of the SRS, the time domain characteristic of the SRS, the relationship between the SRS and the reference RS that is used to determine the spatial relationship information of the target channel or the target signal, or the downlink beam report, whether the target SRS resource is allowed to be configured in the plurality of SRS resource sets.

Optionally, in an embodiment, the target information includes the downlink beam report; and the transceiver module 41 is specifically configured to:
   if the downlink beam report is not associated with an antenna panel of the terminal device or the downlink beam report is not received before the configuration information is sent, determine that the target SRS resource is not allowed to be configured in the plurality of SRS resource sets; or
   if the downlink beam report is associated with the antenna panel of the terminal device, determine, based on a quantity of antenna panels associated with the downlink report, whether the target SRS resource is allowed to be configured in the plurality of SRS resource sets.

Optionally, in an embodiment, the transceiver module 41 is specifically configured to:
   if the quantity of antenna panels associated with the downlink beam report is 1, determine that the target SRS resource is allowed to be configured in the plurality of SRS resource sets; or
   if the quantity of antenna panels associated with the downlink beam report is greater than 1, determine that the target SRS resource is not allowed to be configured in the plurality of SRS resource sets.

Optionally, in an embodiment, the transceiver module 41 is specifically configured to:
   if the quantity of antenna panels associated with the downlink beam report is 1, determine that the target SRS resource is allowed to be configured in the plurality of SRS resource sets; or
   if the quantity of antenna panels associated with the downlink beam report is greater than 1, determine, based on the information about the SRS, whether the target SRS resource is allowed to be configured in the plurality of SRS resource sets.

Optionally, in an embodiment, the information about the SRS includes at least one piece of the following information:
   a usage of the SRS;
   a time domain characteristic of the SRS;
   a relationship between the SRS and a reference RS that is used to determine spatial relationship information of a target channel or a target signal; and
   a type of a reference RS that is used to determine spatial relationship information of the SRS.

Optionally, in an embodiment, the transceiver module 41 is further configured to:
   receive an SRS corresponding to the target SRS resource, where the SRS is sent by the terminal device by using N antenna panels associated with the M SRS resource sets, and N is a positive integer greater than or equal to 1 and less than or equal to M.

Optionally, in an embodiment, the transceiver module 41 is further configured to:
   determine a quantity of antenna panels that are used by the terminal device to send an SRS corresponding to the target SRS resource; and
   if the quantity of antenna panels that are used by the terminal device to send the SRS corresponding to the target SRS resource is 1, receive an SRS that is sent by the terminal device by using an antenna panel associated with a target SRS resource set in the M SRS resource sets, where the target SRS resource set is randomly determined by the terminal device from the M SRS resource sets or the target SRS resource set meets a preset rule.

Optionally, in an embodiment, the preset rule is one of the following rules:
having a minimum set identifier;
having a maximum set identifier;
being associated with an antenna panel corresponding to a beam with best signal quality in a downlink beam report;
being associated with spatial relationship information of a physical uplink control channel PUCCH;
being associated with PUCCH configuration information other than the spatial relationship information of the PUCCH;
being associated with spatial relationship information of a physical uplink shared channel PUSCH; or
being associated with PUSCH configuration information other than the spatial relationship information of the PUSCH.

Optionally, in an embodiment, the transceiver module 41 is specifically configured to:
determine, based on a target condition, the quantity of antenna panels that are used by the terminal device to send the SRS corresponding to the target SRS resource; and
if the target condition is met, determine that the quantity of antenna panels that are used by the terminal device to send the SRS corresponding to the target SRS resource is 1, where the target condition includes a first preset condition, and the first preset condition includes at least one of the following conditions:
a usage of the SRS corresponding to the target SRS resource is beam management;
the SRS corresponding to the target SRS resource is a periodic SRS or a semi-periodic SRS;
a reference RS that is used to determine spatial relationship information of a target channel or a target signal includes the SRS corresponding to the target SRS resource; or
a reference RS that is used to determine spatial relationship information of the SRS corresponding to the target SRS resource is an SRS.

Optionally, in an embodiment, the target condition further includes a second preset condition, and the second preset condition includes at least one of the following conditions:
the terminal device does not report a downlink beam report before the configuration information is sent;
a downlink beam report reported by the terminal device is not associated with an antenna panel of the terminal device; or
a downlink beam report reported by the terminal device is associated with a plurality of antenna panels of the terminal device.

The network terminal provided in this embodiment of the present disclosure can implement the processes implemented by the network terminal in the method embodiments in FIG. 1 to FIG. 2. To avoid repetition, details are not described herein again.

Figure 5:
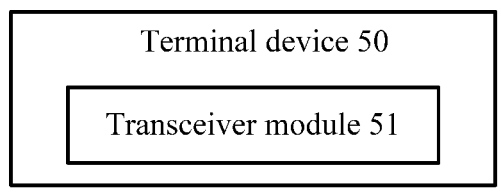
FIG. 5 is a schematic structural diagram of a terminal device according to an embodiment of the present disclosure.

FIG. 5 is a schematic structural diagram of a terminal device according to an embodiment of the present disclosure. As shown in FIG. 5, a terminal device 50 includes:
a transceiver module 51, configured to receive configuration information, where the configuration information is used to configure a target SRS resource in M SRS resource sets, and M is a positive integer greater than or equal to 2.

Optionally, in an embodiment, the configuration information is sent in a case that a network device determines, based on target information, that the target SRS resource is allowed to be configured in a plurality of SRS resource sets.

Optionally, in an embodiment, the target information includes at least one of information about an SRS corresponding to the target SRS resource or a downlink beam report.

Optionally, in an embodiment, the information about the SRS includes at least one piece of the following information:
a usage of the SRS;
a time domain characteristic of the SRS;
a relationship between the SRS and a reference RS that is used to determine spatial relationship information of a target channel or a target signal; and
a type of a reference RS that is used to determine spatial relationship information of the SRS.

Optionally, in an embodiment, the transceiver module 51 is further configured to:
send an SRS corresponding to the target SRS resource to the network device by using N antenna panels associated with the M SRS resource sets, where N is a positive integer greater than or equal to 1 and less than or equal to M.

Optionally, in an embodiment, the transceiver module 51 is further configured to:
determine a quantity of antenna panels that are used to send an SRS corresponding to the target SRS resource; and
if the quantity of antenna panels that are used to send the SRS corresponding to the target SRS resource is 1, send the SRS corresponding to the target SRS resource by using an antenna panel associated with a target SRS resource set in the M SRS resource sets, where the target SRS resource set is randomly determined by the terminal device from the M SRS resource sets or the target SRS resource set meets a preset rule.

Optionally, in an embodiment, the preset rule is one of the following rules:
having a minimum set identifier;
having a maximum set identifier;
being associated with an antenna panel corresponding to a beam with best signal quality in a downlink beam report;
being associated with spatial relationship information of a physical uplink control channel PUCCH;
being associated with PUCCH configuration information other than the spatial relationship information of the PUCCH;
being associated with spatial relationship information of a physical uplink shared channel PUSCH; or
being associated with PUSCH configuration information other than the spatial relationship information of the PUSCH.

Optionally, in an embodiment, the transceiver module 51 is further configured to:
determine, based on a target condition, the quantity of antenna panels that are used to send the SRS corresponding to the target SRS resource; and
if the target condition is met, determine that the quantity of antenna panels that are used to send the SRS corresponding to the target SRS resource is 1, where the target condition includes a first preset condition, and the first preset condition includes at least one of the following conditions:

a usage of the SRS corresponding to the target SRS resource is beam management;

the SRS corresponding to the target SRS resource is a periodic SRS or a semi-periodic SRS;

a reference RS that is used to determine spatial relationship information of a target channel or a target signal includes the SRS corresponding to the target SRS resource; or a reference RS that is used to determine spatial relationship information of the SRS corresponding to the target SRS resource is an SRS.

Optionally, in an embodiment, the target condition further includes a second preset condition, and the second preset condition includes at least one of the following conditions:

a downlink beam report is not reported before the configuration information is received;

a reported downlink beam report is not associated with an antenna panel of the terminal device; or a reported downlink beam report is associated with a plurality of antenna panels of the terminal device.

Optionally, in an embodiment, the transceiver module 51 is further configured to:

establish an association relationship between the M SRS resource sets and an antenna panel.

The terminal device provided in this embodiment of the present disclosure can implement the processes that are implemented by the terminal device in the method embodiment of FIG. 3. To avoid repetition, details are not described herein again.

Figure 6:
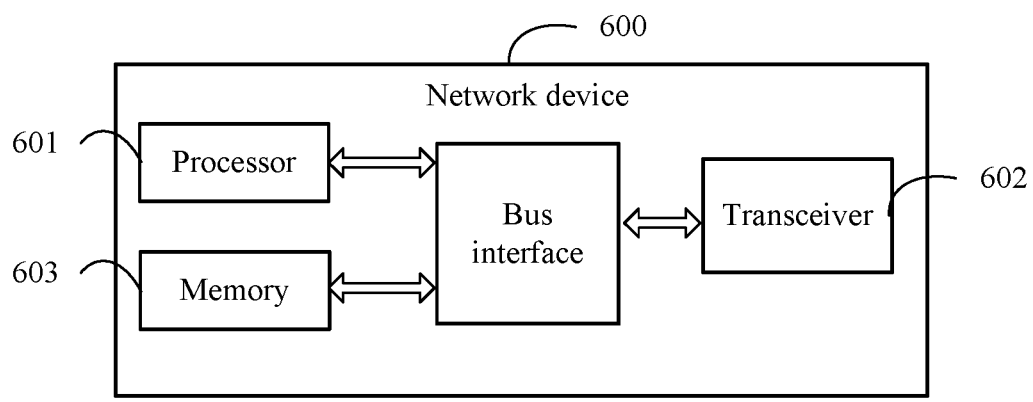
FIG. 6 is a schematic structural diagram of a network device according to another embodiment of the present disclosure.

FIG. 6 is a schematic structural diagram of a network device according to still another embodiment of the present disclosure. As shown in FIG. 6, a network device 600 includes: a processor 601, a transceiver 602, a memory 603, and a bus interface.

In this embodiment of the present disclosure, the network device 600 further includes a computer program that is stored in the memory 603 and can be run by the processor 601. When the computer program is executed by the processor 601, the processes of the foregoing methods shown in FIG. 1 and FIG. 2 are implemented, and a same technical effect can be achieved. To avoid repetition, details are not described herein again.

In FIG. 6, a bus architecture may include any quantity of interconnected buses and bridges. Specifically, various circuits of one or more processors represented by the processor 601 and a memory represented by the memory 603 are interconnected. The bus architecture may further link various other circuits such as a peripheral device, a voltage regulator, and a power management circuit. These are well known in the art, and therefore are not further described in this specification. The bus interface provides an interface. The transceiver 602 may be a plurality of components. To be specific, the transceiver 602 includes a transmitter and a receiver, and provides a unit configured to communicate with various other apparatuses on a transmission medium.

The processor 601 is responsible for management of the bus architecture and general processing. The memory 603 may store data used by the processor 601 when operations are performed.

Figure 7:
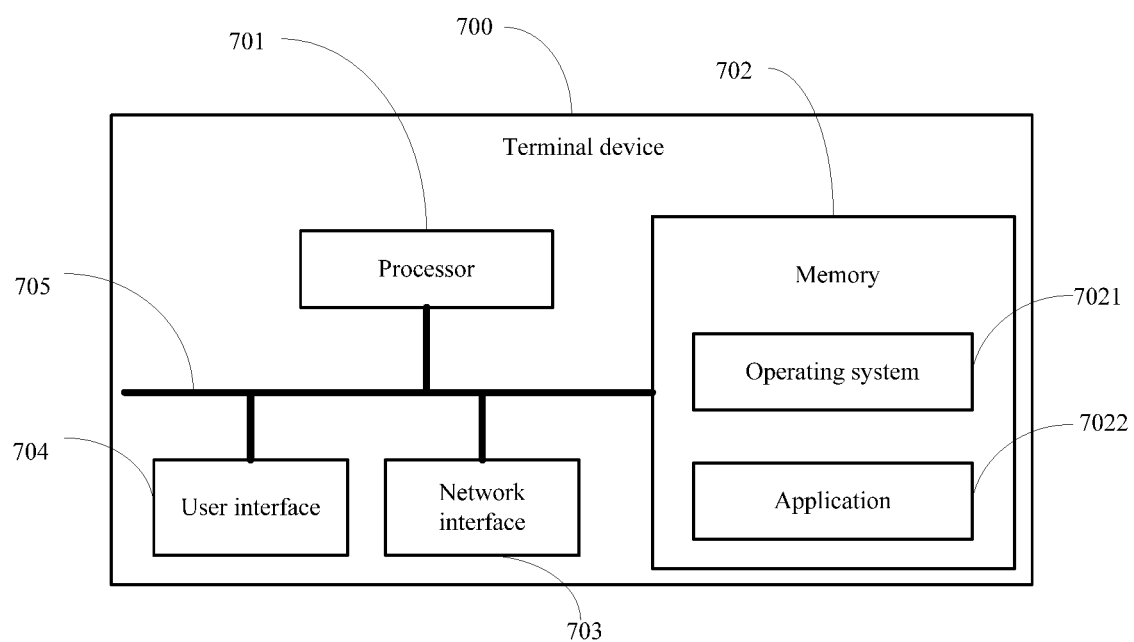
FIG. 7 is a schematic structural diagram of a terminal device according to another embodiment of the present disclosure.

FIG. 7 is a block diagram of a terminal device according to another embodiment of the present disclosure. A terminal device 700 shown in FIG. 7 includes: at least one processor 701, a memory 702, a user interface 703, and at least one network interface 704. The components in the terminal device 700 are coupled together by using a bus system 705. It may be understood that the bus system 705 is configured to implement a connection and communication between these components. In addition to a data bus, the bus system 705 also includes a power bus, a control bus, and a status signal bus. However, for clarity of description, various buses are marked as the bus system 705 in FIG. 7.

The user interface 703 may include a display, a keyboard, or a clicking device (for example, a mouse, a trackball), a touch panel, or a touchscreen.

It may be understood that the memory 702 in this embodiment of the present disclosure may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 702 in the system and the method that are described in the embodiments of the present disclosure is to include but is not limited to these memories and a memory of any other proper type.

In some implementation manners, the memory 702 stores the following element, an executable module or a data structure, or a subset thereof, or an extension set thereof: an operating system 7021 and an application 7022.

The operating system 7021 includes various system programs, for example, a framework layer, a kernel library layer, and a driver layer. The operating system 7021 is configured to implement various basic services and process hardware-based tasks. The application 7022 includes various applications, for example, a media player and a browser, and is configured to implement various application services. A program implementing the method in the embodiments of the present disclosure may be included in the application 7022.

In this embodiment of the present disclosure, the terminal device 700 further includes a computer program that is stored in the memory 702 and can be run by the processor 701. When the computer program is executed by the processor 701, the processes of the foregoing method in FIG. 3 are implemented, and a same technical effect can be achieved. To avoid repetition, details are not described herein again.

The methods disclosed in the foregoing embodiments of the present disclosure may be applied to the processor 701, or may be implemented by the processor 701. The processor 701 may be an integrated circuit chip having a signal processing capability. During implementation, each step of the foregoing method may be completed by using an integrated logic circuit of hardware in the processor 701 or an instruction in a form of software. The processor 701 may be a general purpose processor, a digital signal processor (DSP), an application specific integrated circuit (ASIC), a field programmable gate array (FPGA), another programmable logic device, a discrete gate, a transistor logic device, or a discrete hardware component. The processor 701 may implement or perform the methods, the steps, and logical block diagrams that are disclosed in the embodiments of the present disclosure. The general-purpose processor may be a microprocessor or may be any conventional processor or the like. Steps of the methods disclosed with reference to the embodiments of the present disclosure may be directly executed and accomplished through a hardware decoding processor, or may be executed and accomplished by using a combination of hardware and software modules in the decoding processor. The software module may be located in a mature computer-readable storage medium in this field such as a random access memory, a flash memory, a read-only memory, a programmable read-only memory or an electrically erasable programmable memory, or a register. The computer-readable storage medium is located in the memory 702, and the processor 701 reads information in the memory 702 and completes the steps in the foregoing method in combination with hardware of the processor 701. Specifically, the computer-readable storage medium stores a computer program, and when the computer program is executed by the processor 701, the steps of the foregoing method embodiment in FIG. 3 are implemented.

It may be understood that the embodiments described in the embodiments of the present disclosure may be implemented by hardware, software, firmware, middleware, microcode, or a combination thereof. For implementation with hardware, the processing unit can be implemented in one or more application specific integrated circuits (ASIC), a digital signal processor (DSP), a digital signal processing device (DSPD), a programmable logic device (PLD), a field-programmable gate array (FPGA), general processors, controllers, micro-controllers, microprocessors, and another electronic unit for implementing the functions of the present application, or their combinations.

For software implementation, the technology in the embodiments of the present disclosure may be implemented through modules (for example, procedures or functions) that perform the functions in the embodiments of the present disclosure. Software code may be stored in a memory and executed by a processor. The memory may be implemented in the processor or outside the processor.

The embodiments of the present disclosure further provide a computer-readable storage medium. The computer-readable storage medium stores a computer program, and when a processor executes the computer program, the processes of the foregoing method embodiment are implemented and the same technical effect can be achieved. To avoid repetition, details are not described herein again. The computer-readable storage medium includes a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. Without more restrictions, an element defined by a phrase "including a . . . " does not exclude presence of other identical elements in the process, method, article, or apparatus that includes the very element.

According to the foregoing descriptions of the implementations, a person skilled in the art may clearly understand that the method in the foregoing embodiments may be implemented by using software and a required universal hardware platform, or certainly, may be implemented by using hardware. However, in many cases, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A resource configuration method, comprising: receiving, by a terminal device, configuration information, wherein the configuration information is used to configure a target resource in M SRS resource sets, the target resource is a sounding reference signal (SRS) resource and is called target SRS resource, where M is a positive integer greater than or equal to 2;

Wherein the method further comprises:

determining a quantity of antenna panels that are used to send an SRS corresponding to the target SRS resource; and if the quantity of antenna panels that are used to send the SRS corresponding to the target SRS resource is 1, sending the SRS corresponding to the target SRS resource by using an antenna panel associated with a target SRS resource set in the M SRS resource sets, wherein the target SRS resource set meets a preset rule;

wherein the preset rule is one of the following rules:

having a minimum set identifier;

having a maximum set identifier;

being associated with an antenna panel corresponding to a beam with best signal quality in a downlink beam report;

being associated with spatial relationship information of a physical uplink control channel (PUCCH);

being associated with PUCCH configuration information other than the spatial relationship information of the PUCCH;

being associated with spatial relationship information of a physical uplink shared channel (PUSCH); or being associated with PUSCH configuration information other than the spatial relationship information of the PUSCH.

2. The method according to claim 1, wherein the configuration information is sent in a case that a network device determines, based on target information, that the target SRS resource is allowed to be configured in a plurality of SRS resource sets.

3. The method according to claim 2, wherein the target information comprises at least one of information about an SRS corresponding to the target SRS resource or a downlink beam report.

4. The method according to claim 3, wherein the information about the SRS comprises at least one piece of the following information:
- a usage of the SRS;
- a time domain characteristic of the SRS;
- a relationship between the SRS and a reference reference signal (RS) that is used to determine spatial relationship information of a target channel or a target signal; and
- a type of a reference reference signal (RS) that is used to determine spatial relationship information of the SRS.

5. The method according to claim 2, further comprising:
sending an SRS corresponding to the target SRS resource to the network device by using N antenna panels associated with the M SRS resource sets, wherein N is a positive integer greater than or equal to 1 and less than or equal to M.

6. The method according to claim 5, further comprising:
establishing an association relationship between the M SRS resource sets and an antenna panel.

7. The method according to claim 1, wherein the determining a quantity of antenna panels that are used by to send an SRS corresponding to the target SRS resource comprises:
- determining, based on a target condition, the quantity of antenna panels that are used to send the SRS corresponding to the target SRS resource; and
- if the target condition is met, determining that the quantity of antenna panels that are used to send the SRS corresponding to the target SRS resource is 1, wherein the target condition comprises a first preset condition, and the first preset condition comprises at least one of the following conditions:
  - a usage of the SRS corresponding to the target SRS resource is beam management;
  - the SRS corresponding to the target SRS resource is a periodic SRS or a semi-periodic SRS;
  - a reference RS that is used to determine spatial relationship information of a target channel or a target signal comprises the SRS corresponding to the target SRS resource; or
  - a reference RS that is used to determine spatial relationship information of the SRS corresponding to the target SRS resource is an SRS.

8. The method according to claim 7, wherein the target condition further comprises a second preset condition, and the second preset condition comprises at least one of the following conditions:
- a downlink beam report is not reported before the configuration information is received;
- a reported downlink beam report is not associated with an antenna panel of the terminal device; or
- a reported downlink beam report is associated with a plurality of antenna panels of the terminal device.

9. A network device, comprising a memory, a processor, and a computer program that is stored in the memory and that can be run by the processor, wherein the computer program is executed by the processor to implement:
sending configuration information to a terminal device, wherein the configuration information is used to configure a target resource in M SRS resource sets, the target resource is a sounding reference signal (SRS) resource and is called target SRS resource, where M is a positive integer greater than or equal to 2;
wherein the computer program is further executed by the processor to implement:
determining a quantity of antenna panels that are used by the terminal device to send an SRS corresponding to the target SRS resource; and
if the quantity of antenna panels that are used by the terminal device to send the SRS corresponding to the target SRS resource is 1, receiving an SRS that is sent by the terminal device by using an antenna panel associated with a target SRS resource set in the M SRS resource sets, wherein the target SRS resource set meets a preset rule;
wherein the preset rule is one of the following rules:
- having a minimum set identifier;
- having a maximum set identifier;
- being associated with an antenna panel corresponding to a beam with best signal quality in a downlink beam report;
- being associated with spatial relationship information of a physical uplink control channel (PUCCH);
- being associated with PUCCH configuration information other than the spatial relationship information of the PUCCH;
- being associated with spatial relationship information of a physical uplink shared channel (PUSCH); or
- being associated with PUSCH configuration information other than the spatial relationship information of the PUSCH.

10. The network device according to claim 9, wherein the computer program is further executed by the processor to implement:
- determining, based on target information, whether the target SRS resource is allowed to be configured in a plurality of SRS resource sets; and
- sending the configuration information to the terminal device if the target SRS resource is allowed to be configured in the plurality of SRS resource sets.

11. The network device according to claim 10, wherein the target information comprises at least one of information about an SRS corresponding to the target SRS resource or a downlink beam report.

12. The network device according to claim 11, wherein the information about the SRS comprises at least one piece of the following information:
- a usage of the SRS;
- a time domain characteristic of the SRS;
- a relationship between the SRS and a reference RS that is used to determine spatial relationship information of a target channel or a target signal; and
- a type of a reference RS that is used to determine spatial relationship information of the SRS.

13. The network device according to claim 11, wherein the target information comprises the downlink beam report; and
the determining, based on target information, whether the target SRS resource is allowed to be configured in a plurality of SRS resource sets comprises:
- if the downlink beam report is not associated with an antenna panel of the terminal device or the downlink beam report is not received before the configuration information is sent, determining that the target SRS resource is not allowed to be configured in the plurality of SRS resource sets; or
- if the downlink beam report is associated with the antenna panel of the terminal device, determining, based on a quantity of antenna panels associated with the downlink report, whether the target SRS resource is allowed to be configured in the plurality of SRS resource sets.

14. The network device according to claim 10, wherein the computer program is further executed by the processor to implement:

receiving an SRS corresponding to the target SRS resource, wherein the SRS is sent by the terminal device by using N antenna panels associated with the M SRS resource sets, and N is a positive integer greater than or equal to 1 and less than or equal to M.

15. A terminal device, comprising a memory, a processor, and a computer program that is stored in the memory and that can be run by the processor, wherein the computer program is executed by the processor to implement:
receiving configuration information, wherein the configuration information is used to configure a target resource in M SRS resource sets, the target resource is a sounding reference signal (SRS) resource and is called target SRS resource, where M is a positive integer greater than or equal to 2;
wherein the computer program is further executed by the processor to implement:
determining a quantity of antenna panels that are used to send an SRS corresponding to the target SRS resource; and
if the quantity of antenna panels that are used to send the SRS corresponding to the target SRS resource is 1, sending the SRS corresponding to the target SRS resource by using an antenna panel associated with a target SRS resource set in the M SRS resource sets, wherein the target SRS resource set meets a preset rule;
wherein the preset rule is one of the following rules:
having a minimum set identifier;
having a maximum set identifier;
being associated with an antenna panel corresponding to a beam with best signal quality in a downlink beam report;
being associated with spatial relationship information of a physical uplink control channel (PUCCH);
being associated with PUCCH configuration information other than the spatial relationship information of the PUCCH;
being associated with spatial relationship information of a physical uplink shared channel (PUSCH); or
being associated with PUSCH configuration information other than the spatial relationship information of the PUSCH.

16. The terminal device according to claim 15, wherein the configuration information is sent in a case that a network device determines, based on target information, that the target SRS resource is allowed to be configured in a plurality of SRS resource sets.

17. The terminal device according to claim 16, wherein the target information comprises at least one of information about an SRS corresponding to the target SRS resource or a downlink beam report.

18. The terminal device according to claim 17, wherein the information about the SRS comprises at least one piece of the following information:
a usage of the SRS;
a time domain characteristic of the SRS;
a relationship between the SRS and a reference reference signal (RS) that is used to determine spatial relationship information of a target channel or a target signal; and
a type of a reference reference signal (RS) that is used to determine spatial relationship information of the SRS.

19. The terminal device according to claim 16, wherein the computer program is further executed by the processor to implement:
sending an SRS corresponding to the target SRS resource to the network device by using N antenna panels associated with the M SRS resource sets, wherein N is a positive integer greater than or equal to 1 and less than or equal to M.

20. The terminal device according to claim 15, wherein the determining a quantity of antenna panels that are used by to send an SRS corresponding to the target SRS resource comprises:
determining, based on a target condition, the quantity of antenna panels that are used to send the SRS corresponding to the target SRS resource; and
if the target condition is met, determining that the quantity of antenna panels that are used to send the SRS corresponding to the target SRS resource is 1, wherein the target condition comprises a first preset condition, and the first preset condition comprises at least one of the following conditions:
a usage of the SRS corresponding to the target SRS resource is beam management;
the SRS corresponding to the target SRS resource is a periodic SRS or a semi-periodic SRS;
a reference RS that is used to determine spatial relationship information of a target channel or a target signal comprises the SRS corresponding to the target SRS resource; or
a reference RS that is used to determine spatial relationship information of the SRS corresponding to the target SRS resource is an SRS.

\* \* \* \* \*